(12) United States Patent
Ahmed et al.

(10) Patent No.: US 9,569,005 B2
(45) Date of Patent: Feb. 14, 2017

(54) METHOD AND SYSTEM IMPLEMENTING USER-CENTRIC GESTURE CONTROL

(71) Applicant: Microsoft Corporation, Redmond, WA (US)

(72) Inventors: Abdelrehim Ahmed, Santa Clara, CA (US); Abbas Rafii, Palo Alto, CA (US); Colin Tracy, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/244,151

(22) Filed: Apr. 3, 2014

(65) Prior Publication Data

US 2014/0215407 A1  Jul. 31, 2014

Related U.S. Application Data

(63) Continuation of application No. 12/802,052, filed on May 28, 2010, now Pat. No. 8,693,724.

(60) Provisional application No. 61/217,355, filed on May 29, 2009.

(51) Int. Cl.
| | |
|---|---|
| *G06F 3/01* | (2006.01) |
| *G06F 3/0481* | (2013.01) |
| *G06F 3/0488* | (2013.01) |
| *G06F 3/00* | (2006.01) |

(52) U.S. Cl.
CPC ............ *G06F 3/017* (2013.01); *G06F 3/005* (2013.01); *G06F 3/04815* (2013.01); *G06F 3/04883* (2013.01)

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Lee et al. "Hybrid Feature Tracking and User Interaction for Markerless Augmented Reality." Virtual Reality Conference, Mar. 8, 2008, pp. 145-152.*

(Continued)

*Primary Examiner* — Jon Chang
(74) *Attorney, Agent, or Firm* — Gregg Wisdom; Judy Yee; Micky Minhas

(57) ABSTRACT

A user-centric method and system to identify user-made gestures to control a remote device images the user using a three-dimensional image system, and defines at least one user-centric three-dimensional detection zone dynamically sized appropriately for the user, who is free to move about. Images made within the detection zone are compared to a library of stored gestures, and the thus identified gesture is mapped to an appropriate control command signal coupleable to the remote device. The method and system also provides of a first user to hand off control of the remote device to a second user.

15 Claims, 5 Drawing Sheets

(56) References Cited

U.S. PATENT DOCUMENTS

| | | | |
|---|---|---|---|
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,204,852 B1 | 3/2001 | Kumar et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,707,487 B1 * | 3/2004 | Aman et al. ............... 348/169 |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |

(56) References Cited

U.S. PATENT DOCUMENTS

| | | | |
|---|---|---|---|
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,693,724 B2 * | 4/2014 | Ahmed et al. | 382/103 |
| 2003/0078086 A1 * | 4/2003 | Matsuyama et al. | 463/3 |
| 2004/0190776 A1 | 9/2004 | Higaki et al. | |
| 2008/0026838 A1 | 1/2008 | Dunstan et al. | |
| 2008/0059578 A1 | 3/2008 | Albertson et al. | |
| 2009/0027337 A1 | 1/2009 | Hildreth | |
| 2009/0077504 A1 | 3/2009 | Bell et al. | |
| 2009/0102800 A1 | 4/2009 | Keenan | |
| 2009/0103780 A1 | 4/2009 | Nishihara et al. | |
| 2009/0183125 A1 | 7/2009 | Magal et al. | |
| 2009/0208052 A1 | 8/2009 | Kaplan | |
| 2010/0277489 A1 | 11/2010 | Geisner et al. | |

FOREIGN PATENT DOCUMENTS

| | | |
|---|---|---|
| JP | 08044490 A1 | 2/1996 |
| JP | 2000149025 A | 5/2000 |
| WO | 93/10708 A1 | 6/1993 |
| WO | 97/17598 A1 | 5/1997 |
| WO | 99/44698 A1 | 9/1999 |

OTHER PUBLICATIONS

Kehl et al. "Real-time Pointing Gesture Recognition for an Immersive Environment." Sixth IEEE International Conference on Automatic Face and Gesture Recognition, May 17, 2004, pp. 577-582.*

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Office Action dated Mar. 18, 2013, U.S. Appl. No. 12/802,052, filed May 28, 2010.

Response to Office Action dated Sep. 17, 2013, U.S. Appl. No. 12/802,052, filed May 28, 2010.

Notice of Allowance dated Nov. 19, 2013, U.S. Appl. No. 12/802,052, filed May 28, 2010.

English Abstract of Japanese Publication No. JP 2000149025 published on May 30, 2000.

* cited by examiner

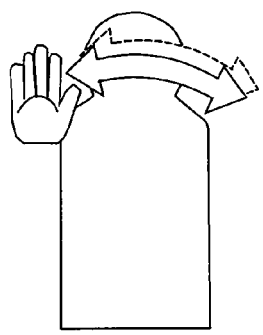
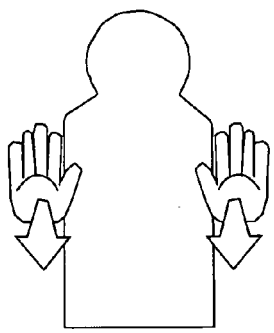
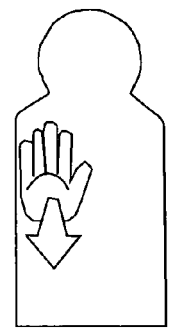
FIG. 3A FIG. 3B FIG. 3C
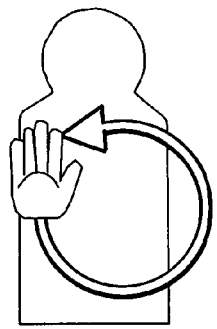
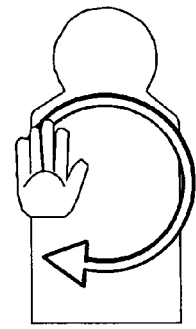
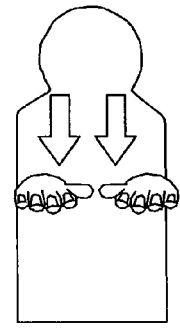
FIG. 3D FIG. 3E FIG. 3F
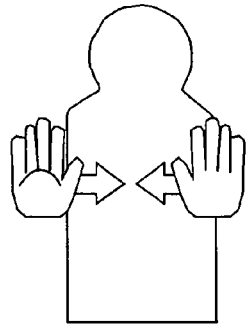
FIG. 3G

METHOD AND SYSTEM IMPLEMENTING USER-CENTRIC GESTURE CONTROL

CLAIM OF PRIORITY

This application is a continuation of U.S. patent application Ser. No. 12/802,052, entitled "METHOD AND SYSTEM IMPLEMENTING USER-CENTRIC GESTURE CONTROL", filed on May 28, 2010, U.S. Pat. No. 8,693,724, which claims the benefit or U.S. Provisional Application 61/217,355 filed on May 29, 2009, entitled "GATED 3D CAMERA".

FIELD OF THE INVENTION

The invention relates generally to methods and systems usable with a depth imaging system to enable a user to remotely control a device, and more specifically to such methods and systems enabling remote control through recognition of user gestures defined within user-centric four-dimensional (x,y,z,time) space.

BACKGROUND OF THE INVENTION

Remote control of devices including video devices has evolved from use of IR or acoustic type remote controls held by a user to control television sets and the like equipped with IR or acoustic recognition systems, to imaging systems that attempt to image the user in two or preferably three dimensions to recognize movements or gestures intended to control the television or other device. FIG. 1 depicts a generic prior art system 10 in which a device 20, here a television, is remotely controlled by a user 30, whose head is shown from the back in the figure. System 10 includes at least one imaging system, here a camera, e.g., 40-1, 40-2, coupled electronically to a signal processor unit 50, whose processor output can control operation of television 20.

The field of view of camera(s) 40-1, 40-2 encompasses at least a portion of three-dimensional space in which the user can make gestures, for example with at least one hand (e.g., left hand 60) to control television 20. If conventional RGB or gray scale images are acquired, then typically two spaced-apart cameras 40-1, 40-2 will be employed. Ideally, allowable gestures would include moving user hand(s) towards or away from television 20, but RGB or gray scale cameras, including a pair of such cameras disposed stereographically, might not correctly discern such movement relative to system 10. RGB or gray scale cameras are readily confused by ambient lighting including light generated by the television display itself, by the clothing of the user, e.g., a white hand in front of a user's white shirt, by reflectivity of objects within the field of view, etc.

Various imaging systems that seek to acquire three-dimensional images of a user creating gestures intended to control a device are known in the art. Some three-dimensional imaging systems use so-called parallel techniques and may include two-cameras, such as shown in FIG. 1. Various two-camera implementations include so-called passive stereo in which a sparse depth map is created in which only some sensor pixels in the depth map actually contain depth information. Another two camera approach to acquiring depth images is texture patterned stereo, in which the depth system creates a pattern that generates texture but does not encode depth information. If a speckle-like randomly patterned illumination is used, there may be sufficient texture in the imaged scene to enable creation of a dense depth map. Yet another type of two camera imaging system is depth-coded patterned stereo, in which a patterned Illumination source codes depth information and can provide a dense depth map. A problem common to many two-camera systems is occlusion and so-called correspondence ambiguity. It can be challenging to combine the imagery acquired by two spaced-apart cameras to unambiguously determine depth in an imaged scene.

Some parallax imaging methods use a single camera with a patterned source of illumination. So-called structured light systems can create a near-far qualitative depth map, but may suffer from an imprecise baseline. PrimeSense, an Israeli company, markets such structured light systems. So-called active stereo single camera systems can acquire a dense depth map with a precise baseline.

Another and somewhat superior method of three-dimensional imaging uses time-of-flight (TOF) information to create a dense depth map. Canesta, Inc. of Sunnyvale, Calif. (assignee herein) has received several dozen U.S. patents directed to methods and systems that can acquire true depth images. Exemplary such U.S. patents received by Canesta, Inc. include U.S. Pat. No. 6,323,942 (2001) CMOS-Compatible Three-Dimensional Image Sensor IC, U.S. Pat. No. 6,515,740 (2003) Methods for CMOS-Compatible Three-Dimensional Image Sensing Using Quantum Efficiency Modulation, U.S. Pat. No. 6,522,395 (2003) Noise Reduction Techniques Suitable for Three-Dimensional Information Acquirable with CMOS-Compatible Image Sensor ICs, U.S. Pat. No. 6,614,422 (2003) Methods for Enhancing Performance and Data Acquired from Three-Dimensional Image Systems, U.S. Pat. No. 6,674,895 (2004) Methods for Enhancing Performance and Data Acquired from Three-Dimensional Image Systems, U.S. Pat. No. 6,678,039 (2004) Method and System to Enhance Dynamic Range Conversion Useable with CMOS Three-Dimensional Imaging, U.S. Pat. No. 6,710,770 (2004) Quasi-Three-Dimensional Method and Apparatus to Detect and Localize Interaction of User-Object and Virtual Transfer Device, U.S. Pat. No. 6,906,793 (2005) Methods and Devices for Charge Management for Three-Dimensional Sensing, U.S. Pat. No. 7,151,530 (2006) System and Method for Determining an Input Selected by a User Through a Virtual Interface, U.S. Pat. No. 7,176,438 (2007) Method and System to Differentially Enhance Sensor Dynamic Range Using Enhanced Common Mode Reset, U.S. Pat. No. 7,212,663 (2007) Coded-Array Technique for Obtaining Depth and Other Position Information of an Observed Object, U.S. Pat. No. 7,321,111 (2008) Method and System to Enhance Differential Dynamic Range and Signal/Noise in CMOS Range Systems Using Differential Sensors, U.S. Pat. No. 7,340,077 (2008) Gesture Recognition System Using Depth Perceptive Sensors, U.S. Pat. No. 7,352,454 (2008) Methods and Devices for Improved Charge Management for Three-Dimensional and Color Sensing, and U.S. Pat. No. 7,507,947 (2009) Method and System to Differentially Enhance Sensor Dynamic Range Using Enhanced Common Mode Reset.

Typically a TOF system emits optical energy and determines how long it takes until at least some of that energy is reflected by a target object and arrives back at the system to be detected by an array of pixel detectors. If $t_1$ denotes roundtrip TOF time, then the distance between target object and the TOF system is Z1, where $Z1=t_1 \cdot C/2$, where C is velocity of light. Most Canesta TOF systems are phase-based and compare shift between phase of the modulated emitted optical energy and phase of the reflected energy in determining depth Z. Canesta TOF systems are operable with or without ambient light, have no moving parts, and can be mass produced using CMOS techniques. Phase-based TOF systems are also believed available from PMD Technology of Siegen, Germany, Mesa Imaging, AG of Zurich, Switzerland, and possibly Optrima NV of Brussel, Belgium.

Another method of TOF systems that does not measure phase shift is the shutter type TOF system. The shutter may be an active optic device, perhaps GaAs as developed by 3DV Corp. of Israel, or perhaps an electronic shutter, e.g., CMOS, as developed by TriDiCam GmbH of Germany.

Three-dimensional imaging may be accomplished without using a parallel method, or a TOF method, for example by using spaced-apart cameras from whose images relative or inferred depth Z information may be had. Such systems are believed to be developed by XTR 3D Company of Israel. Alternative methods for inferring depth may rely upon camera motion, so-called structure-from-motion analysis, but these methods are not deemed sufficiently fast for use in a gesture recognition system. Other methods for inferring depth include so-called depth-from-focus techniques in which the focal plane of an imaging camera is changed to create a depth map. However such techniques may not be adequately fast or accurate for real-time gesture recognition.

Having briefly reviewed the various methods known in the art for obtaining depth or Z images, consider now an exemplary prior art approach to gesture recognition with reference to FIG. 1. Assume that system 10 include a display 20 whose characteristic(s) a user 30 will attempt to influence or alter using user-made gestures that are imaged here by spaced-apart cameras 40-1, 40-2. System 10 is what may be termed device-centric and typically requires closed-loop visual feedback between user 10 and a portion of what is displayed on television system 20. FIG. 1 shows, for example, a cursor 70 near the upper left corner on the television display, and also shows a double-arrow icon 80 near the right edge of the television display. In this example, if the user can cause cursor 70 to move to the right, in the direction of phantom cursor 70', and overlie the upper or lower portion of arrow 80, the user can thus cause an increase or decrease in the sound volume from television 20.

In practice, system 10 will have pre-defined several gestures that the user will know a priori. For example, to move cursor 70 to the right, the user may move the left hand to the right, as indicated by the position of phantom hand 60'. Unfortunately doing so involves hand-eye coordination between the displayed cursor on television 20, and the user's hand position, as imaged by cameras 40-1, 40-2. The (x,y,z) coordinate system relied upon by system 10 is an absolute coordinate system that is defined relative to television set 20. This coordinate system means that the distance $\Delta X'$ through which the user's hand must be moved to move the cursor a distance $\Delta X$ on the television display is not constant. Thus, if the user is say 8' (2.5 m) away from the television set, distance $\Delta X'$ will be substantially greater than if the user were say 4' (1.25 m) away from the television set. In addition to this varying distance sensitivity, the user must keep an eye on the cursor position. In the example of FIG. 1, once the user moves the cursor to the desired up or down portion of double arrow 80, the user might then confirm this selection, perhaps by moving the hand in the direction of the television screen. Having thus executed the desired correction to the television volume, system 10 can automatically remove both the cursor and double arrow from the television display. If the user later wishes to make some other adjustment, perhaps to change channels on television 20, the user will make some other gesture known to system 10, and the cursor and other relevant icon(s) or images will appear on the television screen.

While device-centric systems such as described in FIG. 1 can work, more or less, there is room for improvement. The necessity for hand-eye feedback between the user and what is presented on the television screen may not be desirable for all classes of users. Such feedback requires some user training, e.g., how much hand movement will cause how much screen movement at what distance away from the screen. This need for user training may arise because device-centric systems have variations as the user changes position relative to the device that can affect the user's feel for device control. For example, unless scaling is done correctly, an action that requires some subtle motion when the user is far from the device can require large motions when the user is close to the device. Unless addressed in some fashion, this scaled feedback characteristic of some prior art systems can limit the type of user gestures that can reliably be recognized and acted upon.

Further, systems such as described in FIG. 1 are device-centric in that the three-dimensional coordinate system used by the system is defined relative to the device, and not to the user. In some applications the device-centric nature of the system can result in ambiguous recognition of what device control action was intended by a given user gesture. For example, a user gesture intended to increase the channel number should not be misinterpreted as a user desire to increase the device volume setting, etc.

What is needed is a remote control method and system that does not require hand-eye feedback between the user and the device being controlled. Preferably such method and system would employ a user-centric relative coordinate system rather than an absolute device-centric coordinate system. Such method and system would free the user from undue concentration upon the device screen to implement remote control. Preferably such method and system should use three-dimensional rather than two-dimensional image sensing, be intuitive to the user, and not require substantial user training. Further such method and system should reliably recognize user gestures without ambiguous interpretations. Gestures should be user-friendly to perform and remember, and should be defined to be unambiguous with good detection discrimination characteristics. Preferably gestures should have no state, e.g., nothing to remember, and should permit transitioning to another gesture unambiguously.

The present invention provides such a remote control method and system.

SUMMARY OF THE PRESENT INVENTION

The present invention provides a remote control system and method that is user rather than device centric, and thus relies upon local user-centric coordinates rather than absolute, device or camera system, coordinates. A local environment or three dimensional zone of interaction is defined about the user, and can move as the user moves. The zone of interaction preferably is customized to the user in the sense that a large adult user will have a larger volume zone of interaction than a small child user. The user zone of interaction defines the three-dimensional space in which gestures will be made and detected. Defined user gestures made within the zone of interaction are recognized by a preferably three-dimensional imaging system disposed on or about the device to be controlled. Preferably a small number, three perhaps, three-dimensional hot spots or hot zones are defined within this larger zone of interaction. While user gestures are not confined to be made solely within these hot spots, defining these hot spots enables detection of specific touch gestures. Such user gestures made within a hot spot preferably include at least "touching" the hot spot, and drawing a shape (perhaps a circle or an arc) within the hot spot. As such, the system and method uses real-world coordinates and in terms of feedback can substantially de-couple the user from the device being controlled. Because the local environment is defined relative to the user, a form of metric confirmation exists such that user gestures made near or far from the device are recognized without the need for user hand-eye coordination or user-device calibration. In embodiments of the present invention, preferably there is always at least a coarse one-to-one mapping between the user's local environment zone of interaction and the device display, which mapping is completely transparent to the user.

A library of user friendly and intuitive gestures is predefined such that preferably no substantial user training is required to learn or to remember the gestures. The gestures themselves are defined so as to be unambiguous with good detection discrimination characteristics. The different gestures preferably have no state, e.g., are memory-less, and preferably permit transitioning to another gesture unambiguously. The user need not even look at the device being controlled, e.g., a television, to make a gesture. Further, there is no compelling need for a cursor display, and there is no visual feedback that requires hand-eye coordination. Good gesture recognition according to the present invention relies upon two detection properties, namely how well the three-dimensional imaging system images the gesture, and how well the inventive method can discriminate the gesture from other potential gestures, motions, or noise.

The system includes a preferably three-dimensional imaging system, such as is known in the art, and a processor unit that includes memory storing at least one software routine that defines a library of user gestures, and at least one algorithm for interpreting data from the three-dimensional imaging system and assigning to the data an appropriate user gesture made within a hot zone in a region of interaction defined relative to the user. The processor unit preferably includes a processor that executes the algorithm and issues appropriate command signals to the device, e.g., television, being remotely controlled, although an external processor could instead be used. As such, the present invention implements what may be described as gesture syntax, rather than mere gesture semantics.

In the event a user gesture cannot be uniquely identified by the processor unit, the system and method can display on the device choice icons showing what is believed to be the current gesture, and asking for confirmation, perhaps by the user moving a hand toward the device. The three-dimensional camera system may, but need not be, a three-dimensional TOF system. Such an imaging system readily enables hand or other object movements toward and away from the device to be reliably detected, regardless of shape or size or color or variations in ambient light, including light from the television display itself.

Other features and advantages of the invention will appear from the following description in which the preferred embodiments have been set forth in detail, in conjunction with their accompanying drawings.

BRIEF DESCRIPTION OF THE DRAWINGS

FIGS. 3A-3G depict a library of exemplary gestures, according to embodiments of the present invention;

DETAILED DESCRIPTION OF THE PREFERRED EMBODIMENT

Figure 2:
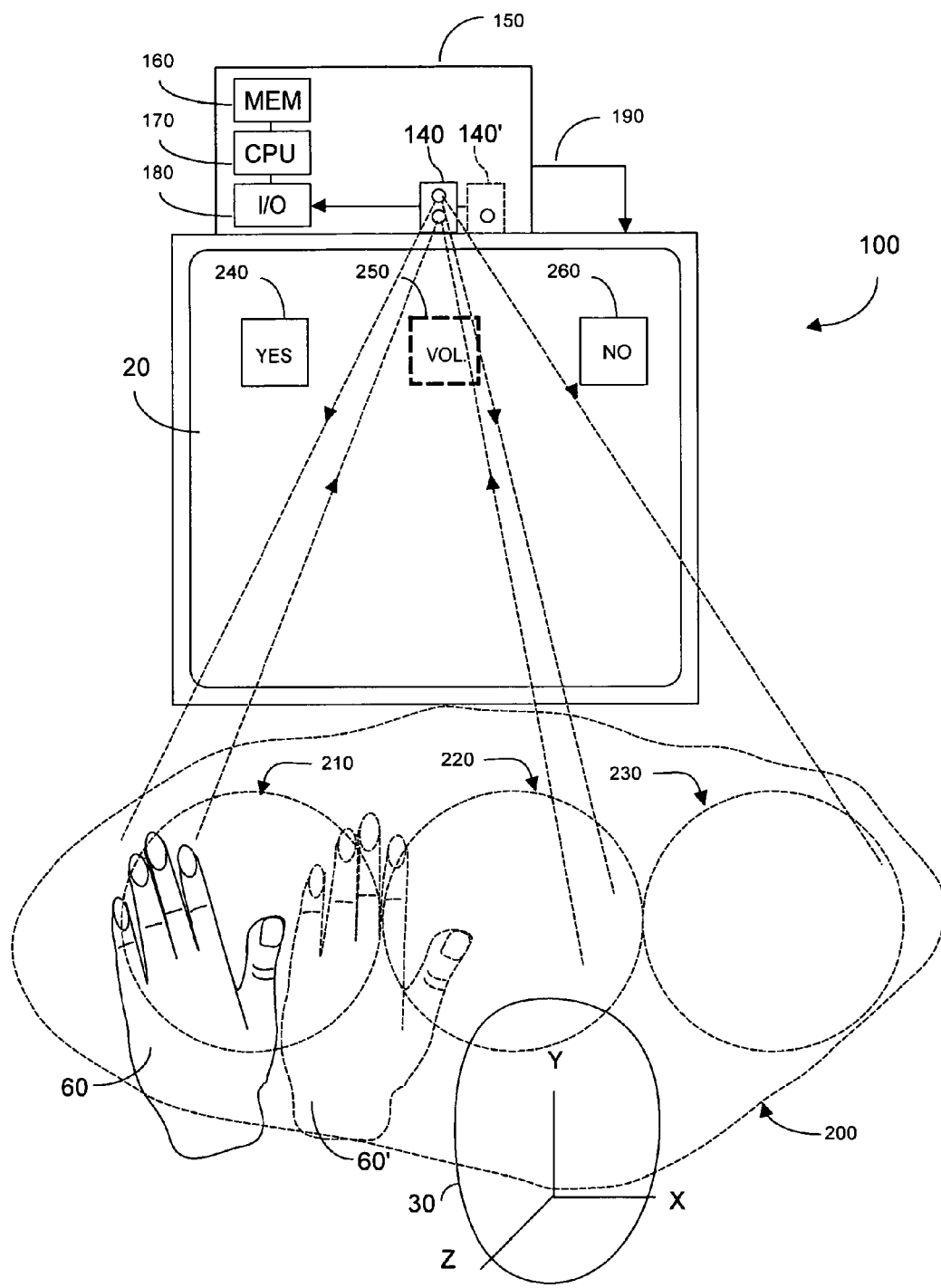
FIG. 2 depicts a user-centric gesture recognition system, according to embodiments of the present invention.

FIG. 2 depicts a gesture recognition system 100, according to embodiments of the present invention. System 100 includes a preferably three-dimensional imaging system 140, such as is known in the prior art, whose effective field of view encompasses a three-dimensional space in which at least one user may be present. For ease of illustration, system 140 is depicted as a generic TOF system, although a non-TOF imaging system may instead be used. For example, a system employing multiple cameras might be used, as could other prior art three-dimensional imaging systems, indicated generically by 140'. In FIG. 2, exemplary TOF system 140 emits optical energy (shown as phantom lines emanating away from system 140) towards the user 30, and detects a fraction of that optical energy reflected by the user or other object(s) within the field of view. This reflected energy is depicted as phantom lines directed back to TOF system 140. Gesture recognition system 100 also includes a processor unit 150, which preferably includes memory 160, a processor or microprocessor 170, and various input/output circuitry 180. Output signals from processor unit 150 are coupled via path 190, to control television or other device 20, responsive to user gestures that are recognized by three-dimensional imaging system 100.

As indicated by the coordinate axes, the present invention uses world coordinates that are defined relative to user 30, rather than relative to device 20 or system 100. System 100 defines, relative to user 30, a local environment termed herein a three-dimensional zone of interaction 200, which zone preferably is sized to the size of the user, and will move as the user moves. User gestures, e.g., hand or arm gestures, made within the interaction zone are detected by system 100. Preferably within zone of interaction 200 a small number of three-dimensional hot zones 210, 220, 230 are defined, e.g., at least two and preferably three such zones. These hot zones are regions of three dimensional space defined within the larger interaction zone. In general, the user can draw shapes with one or more hands, e.g., perhaps a circle, an arc, etc., for detection within the interaction zone, However, embodiments of the present invention preferably look for occurrence of user touch gestures within the hot zones defined within the interaction zone. In such embodiments, the user can simply "touch" a hot zone, or make hand movement within a hot zone to commence or create a recognizable gesture. In practice, for a given user 30, zone of interaction 200 might have exemplary dimensions on the order of perhaps 3' (1 M) in left-to-right width, 2' (0.7 m) in height, and perhaps 2' (0.7 m) in front-to-back depth, although other dimensions could instead be defined. Each hot zone 210, 220, 230 may occupy a shape, perhaps a sphere, with transverse diameter of perhaps 2' (0.7 m) within zone of interaction 200, although again different dimensions could be defined. However for a physically larger user 30, all of these dimensions would automatically be scaled upward by system 100. Thus a user with long arms would interact with a physically larger zone of interaction than a user with small arms, etc. An advantage of defining hot zones according to the present invention is to reduce occurrence of false detections, or detection of unintended gestures.

Because the present invention uses a world coordinate system referenced to user 30, it is understood that if user 30 moves around, zone of interaction 200 and hot zones 210, 220, 230 can dynamically move and re-size with the current user position. Thus, if the user moves towards television device 20 and then makes a gesture with one or more hands, the present invention will recognize the gesture. If the user then steps backwards or sideways and makes the same gesture, the present invention will still recognize the gesture, because the gesture is made within the interaction zone, which is defined relative to the coordinate system of the user. Advantageously, a user's gestures can be recognized, whether the user is standing when making the gesture, sitting when making the gesture, as long as the user's gesture is made within the three-dimensional imaging system field of view.

Furthermore, the velocity of the gesture may be coupled to the speed of an action on the screen of device 20. For instance, if the user's right hand is moved from right to left, the device can respond by shifting a sequence of images on the screen in the same direction. If the user's hand moves more rapidly, the images can shift more rapidly. If the user hand moves slowly, the images shift slowly. As noted, in the present invention velocity of the user's hand is determined in world coordinates with respect to the user. In the example of the user's hand shifting a displayed sequence of images, the coupling between the user action and device response will remain substantially constant regardless of the distance between the user and the device.

As noted above, preferably system 100 detects gestures that are performed inside the interaction zone, which can include regions external to the hot zones. In addition to detecting user gestures to control a device, embodiments of the present invention can also detect when a first user hands off device control to a second user.

User 30 is free to move about relative to device 20, and because (x,y,z) world coordinates are defined relative to the user, and thus zone of interaction 200 moves with the user, to dynamically define a local environment. It is intuitive for a user to be told he or she can interact with a three-dimensional zone of interaction defined in front of him or her, centered at perhaps shoulder level. It is also intuitive for the user to be told that he or she can touch or draw shapes within three dimensional hot zones defined within the zone of interaction. As such, a user can make a gesture within the zone of interaction without having to even look at device 20. This is easier for the user than having to concentrate on device 20, to look perhaps for a cursor, and then to manipulate a hand to move the cursor toward a desired region on the television display. This desired elimination of hand-eye feedback further contributes to the user-friendly manner in which gestures are created, without substantial training or hand-eye coordination requirements, according to the present invention. However, as will be described, should a gesture not immediately be recognized by system 100, system 100 can temporarily display preferably three icons 240, 250, 260 on device 20, which icons correspond to the preferably three hot zones 210, 220, 230. In this embodiment, if there were N hot zones defined within interaction zone 200, then there would be a like number N of displayed icons. Of course a different number of displayed icons and a different number of hot zones could be used. In FIG. 2, one of these icons, perhaps center icon 250, can display what system 100 believes to be the intended gesture or perhaps a target of the gesture. The target of the gesture refers to an object on the display that is intended to respond to the gesture, perhaps an image in a sequence of images that will move in a direction and with a velocity responsive to motion of the user's hand. In FIG. 2, adjacent icons, e.g., 240, 260, can give the user the option to confirm or reject the thus-interpreted gesture, e.g., by interacting with one of the preferably three hot zones 210, 220, 230.

Figure 1:
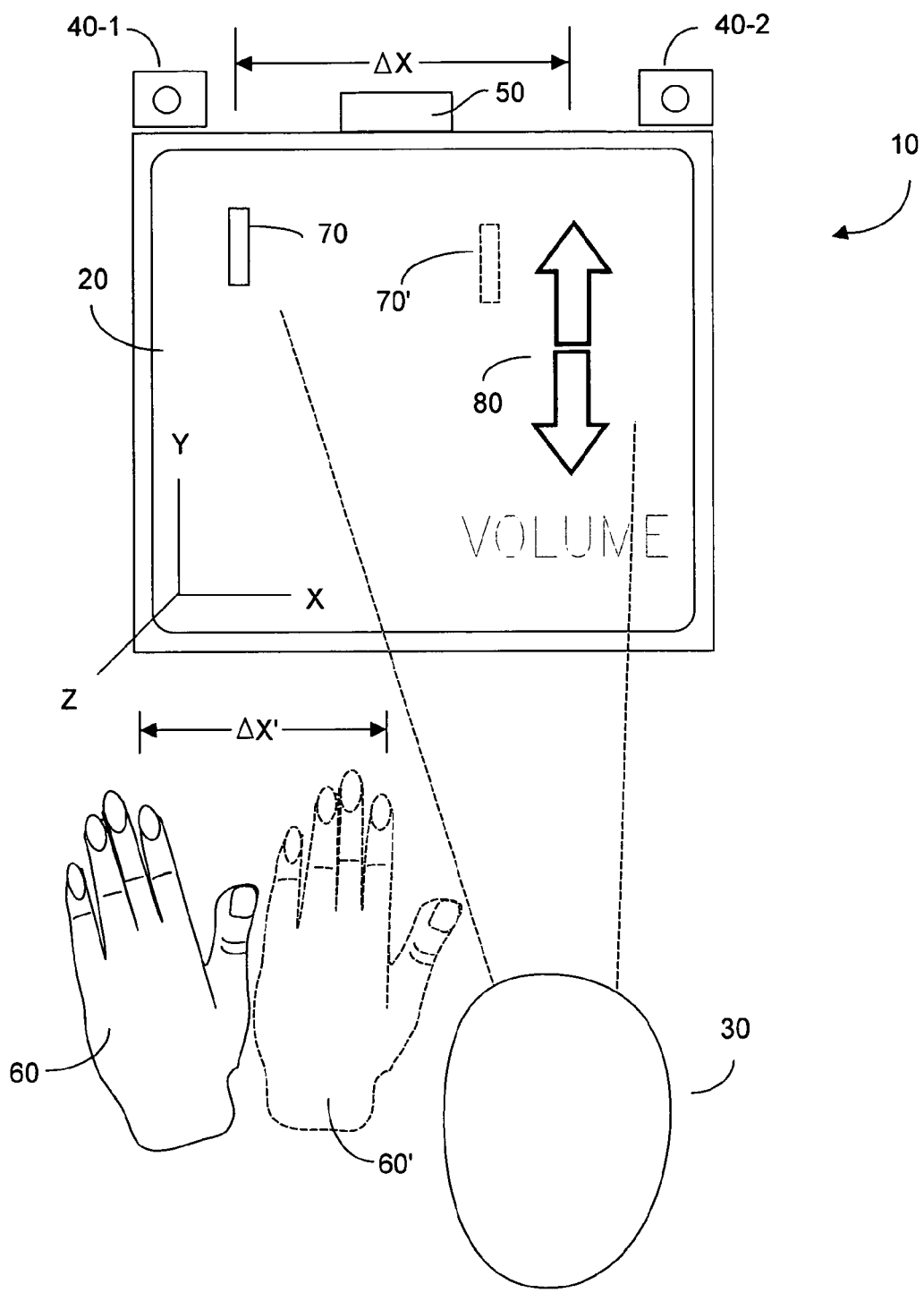
FIG. 1 depicts a generic prior art gesture recognition system in which device-centric coordinates are used, and hand-eye coordination and device calibration are typically required on the part of the user, according to the prior art.

It is useful at this juncture to briefly consider FIGS. 3A-3G in which a library (stored or storable in memory 160) of exemplary gestures is shown. In FIG. 3A, a "swiping" gesture made at head level is defined as "turn on/menu". In FIG. 3B, a movement of both open spaced-apart hands towards device 20 is defined as "pause/play". Such forward motion is readily detected by TOF camera system 140. By contrast, conventional two-dimensional RGB or gray scale cameras such as used in the prior art system of FIG. 1 have a more difficult challenge with respect to reliably detecting such movements, and with respect to not being tricked by lighting, contrast changes, background colors, etc. Gestures such as shown in FIGS. 3B and 3C would be challenging for prior art two-dimensional RGB or gray scale systems to recognize properly because of their Z-direction movement.

In FIG. 3C, holding the open right hand briefly then moving forward can define a "select" gesture. In other embodiments, a select gesture can be defined in terms of the user's hand being present within a hot zone for a given amount of time, even without moving the hand within the zone. For example, a gesture may cause a menu to appear on television device 20, and the user may be given an option, perhaps an icon of a DVD if it is desired to now view a DVD movie rather than continue to watch a television show. The user can "select" to go into the DVD movie mode by selecting the DVD icon. The user could then use a gesture, perhaps as shown in FIG. 2B, to start to play the DVD movie, or if the movie is playing, to pause the movie, and so forth.

The appearance of icons on the television device is referred to herein as a GUI event, and typically can occur to resolve potential ambiguity in a gesture. Thus, the "volume" icon 250 might appear as shown in FIG. 2, to ask the user to confirm with a yes or no whether indeed the last detected gesture was intended to alter the device volume level. In such instance the user can motion left or right with a hand to select, respectively, "yes" or "no", since the "yes" icon is to the left on the television screen, and the "no" icon is to the right. In this example, the user's will move from one hot zone to a hot zone to the left, to indicate "yes", or will move from one hot zone to a hot zone to the right to indicate "no". Because this gesture is responsive to an icon query on the television screen, the icon will not be interpreted as a gesture to turn on the device, or to bring up a menu, as in FIG. 3A. System 100 can then confirm the user's selection, e.g., "yes", perhaps by causing the "yes" icon to now be highlighted, or to appear to vibrate back and forth slightly. Thus, in the above embodiments, select gestures may be defined in terms of the user's hand, stationary or moving, remaining in a hot zone for a certain amount of time. It is understood that the present invention can be practiced without recourse to menus appearing on the device display, or indeed without requiring the user to view the system under control.

In FIGS. 3D and 3E, clockwise or counter-clockwise circular motion of the open right hand commands volume change. In FIG. 3F, downward motion of both hands closely-spaced with palms downward is "mute/unmute", while in FIG. 3G, moving both open hands toward each other defines a "turn off" gesture. Of course more or fewer gestures could be defined.

According to embodiments of the present invention, to be unambiguously recognizable by system 100, each gesture emphasizes syntax rather than semantics. According to the present invention, a well defined gesture has good detection and good discrimination properties. Good detection means that three-dimensional depth imaging system 140 can readily image the gesture, and good discrimination means that the detected gesture is readily discriminated from other gestures.

For example, in FIG. 3A, the hand swipe gesture is not readily confused with any of the other gestures shown, and thus has good discrimination properties. But if several swipes to the right meant "turn on" and several swipes to the left meant "turn off", there would be ambiguity. These gestures would be ambiguous because after completing one swipe to the right, the hand would have to be returned from right-to-left to repeat the same gesture. But the act of returning from right-to-left might be interpreted as "turn off" rather than the return motion associated with "turn on". This example of a poorly defined gesture also demonstrates what is meant by the preferred requirement that a good gesture be stateless or memory-less, e.g., it should not have an initial condition. Thus in FIG. 3C or 3D, making continuous circular motion in a clockwise or counter-clockwise direction is stateless or memory-less because there is no requirement for a starting position. Similarly in FIG. 3F, there is no requirement that the two hands commence their downward motion from a given starting point, and thus this gesture has the desired characteristic of being stateless or memory-less. Thus, many presently preferred gesture movements might be said to be AC-coupled, unlike many DC-coupled gestures in the prior art. This use of the terminology AC-coupled or DC-coupled is analogous to an electronic signal as viewed on an oscilloscope: the DC-coupled signal will have a static DC offset, e.g., a starting point level, whereas the AC-coupled signal has no offset. However the present invention is sufficiently flexible to recognize even so-called DC-coupled gestures. Presently preferred gestures according to the present invention are not defined as sub-sets of other gestures, although they could of course be so defined. Thus if one gesture is a full circular hand rotation, perhaps to command device volume change, it could be potentially confusing to also have a different gesture that is a half-circle, e.g., a sub-set of the full circle gesture.

According to the present invention, gestures are disambiguated by assigning what might potentially be an ambiguous gesture to a single function, e.g., the swipe gesture of FIG. 3A could be ambiguous if a swipe to the right defined one gesture, and a swipe to the left defined another gesture. However the back-and-forth swipe gesture of FIG. 3A defines a single gesture, here turn-on/menu. Note too that gestures should not include motions that a user might normally make, for example, applauding, scratching one's nose or head. These movements can occur almost subconsciously and should not be used to define gestures, according to the present invention.

In many instances the user may be seated on a chair or couch, with another person or persons sitting close by. Understandably system 100 will define a single zone of interaction adjacent the user, and will ignore motions, including gesture-like motions, made by other persons. However if the user wishes to transfer remote control over device 20 to another person, a gesture may be defined to alert system 100 that a user in a different location, perhaps seated to the right of the original user, is about to take control. System 100 would then redefine the zone of interaction and the hot spots within, relative to the new user. At this juncture, motions including gesture type motions made by the original user will not be responded to, because they no longer occur within the relevant zone of interaction.

Figure 4:
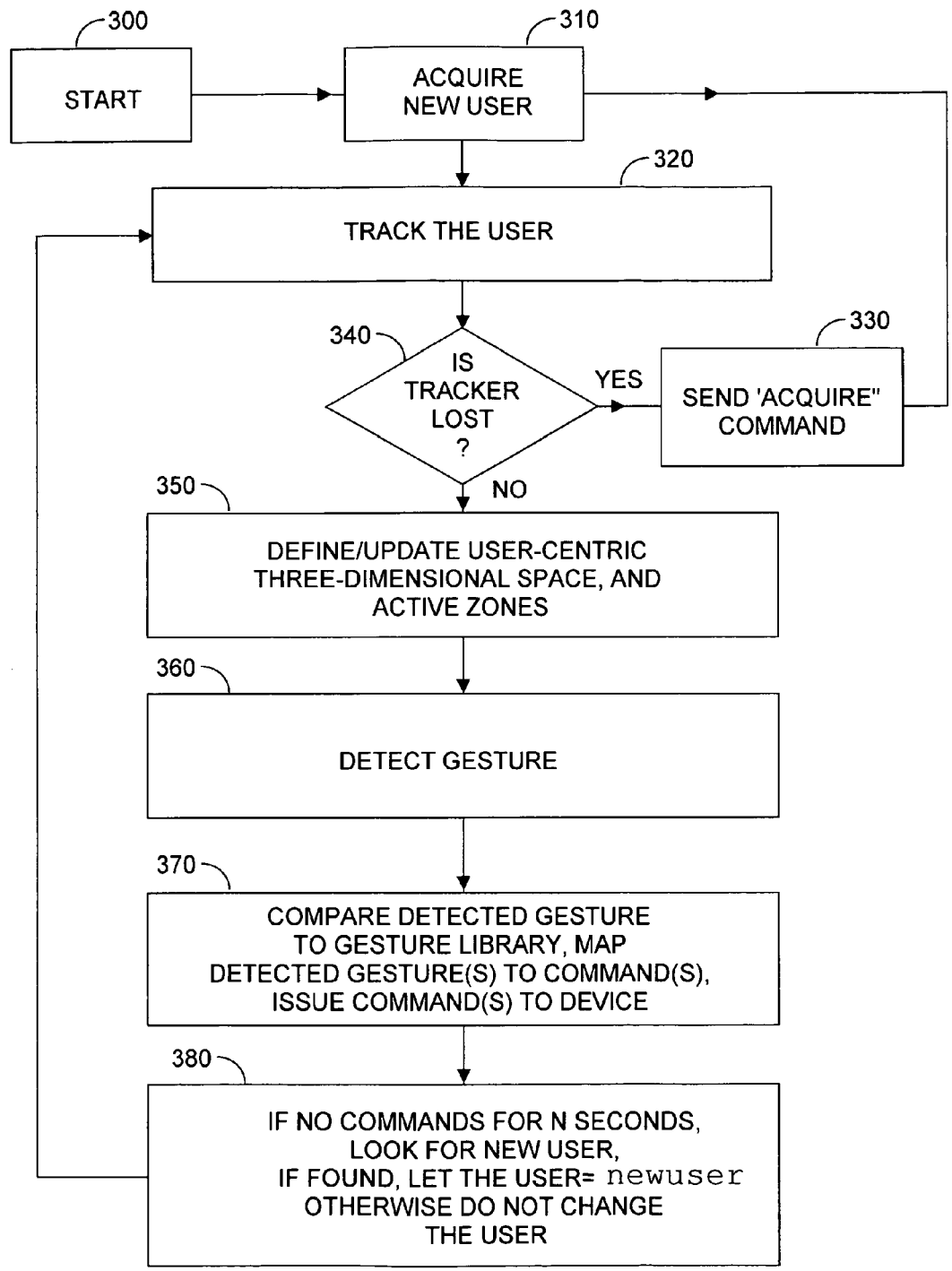
FIG. 4 is a flow chart depicting generic exemplary method steps implementing user-centric gesture control, according to embodiments of the present invention.

FIG. 4 depicts an exemplary algorithm such as can be stored in memory 160 in system 100 (see FIG. 2) for execution by processor 170 (or other processor) to implement gesture recognition, according to embodiments of the present invention. Initially system 100 will acquire several frames of data to image user 30, and to then define an interaction zone 200, and hot spots or hot zones 210, 220, etc. therein for the imaged user. At method step 300, the user makes a "start" or "turn-on" gesture, for example as shown in FIG. 3A, and at step 310, system 100 acquires user 20. At step 320, system 100 tracks the imaged user, which means that if the user moves about relative to the position of the controlled device 20, system 100 can successfully image the user. Gesture recognition according to the present invention is user-centric, not device-centric, and the user is free to move about relative to the position of device 20.

At step 340, the system confirms that the imaged user is indeed being tracked. If for some reason tracking is not occurring, an "ACQUIRE" command is used at module 330 and step 310 is repeated until the user is properly acquired and tracked.

Once user tracking is confirmed, method step 340 passes off to step 350, and appropriately sized user-centric zones including hot zones are defined for this user. As noted, a physically large user will have larger volume zones defined than would be the case for a physically small user. Acquired images of user 20 enable system 100 to approximate the user's size and to cause step 350 to generate appropriately sized three-dimensional zone spaces in which gesture detection preferably will occur.

At method step 360, acquired images of the user and user hands within the detection zones and hot zones are examined to detect user made gestures. As noted earlier, the preferred use of hot zones in which touch type gestures should be made tends to reduce false detection of gestures, as well as ambiguous identification of detected gestures.

At method step 370, system 100 compares the detected gesture with contents of a user gestures that have been previously stored, e.g., in memory 160 in system 100. A best determination of the user gesture is made, and this gesture is then mapped to appropriate command(s) for controlled device 20. For example, if the user gesture is determined to mean "increase volume level" for device 20, a method step 370 the appropriate electronic command signals to cause an increase in device 20 audio volume level will be generated. These signals can be coupled to device 20 via cable(s), or wirelessly, e.g., IR, Bluetooth, etc.

Having made the appropriate parameter change to operation of device 20, at method 380, system 100 will continue to image the user. If a predetermined amount of time lapses without detection of further gestures, system 100 will look to see whether there is a new, substitute, user, perhaps positioned other than precisely where the present-former user was last positioned. If a new user is found, and it is determined that the new user is performing an "acquire me" gesture, the software in memory 160 being executed, e.g., by processor 170 (or other processor) will substitute the new user for the old user. But if no new user is found, the old user will remain as the current user, whose continuing user gestures will be imaged and processed to control device 20.

Figure 5:
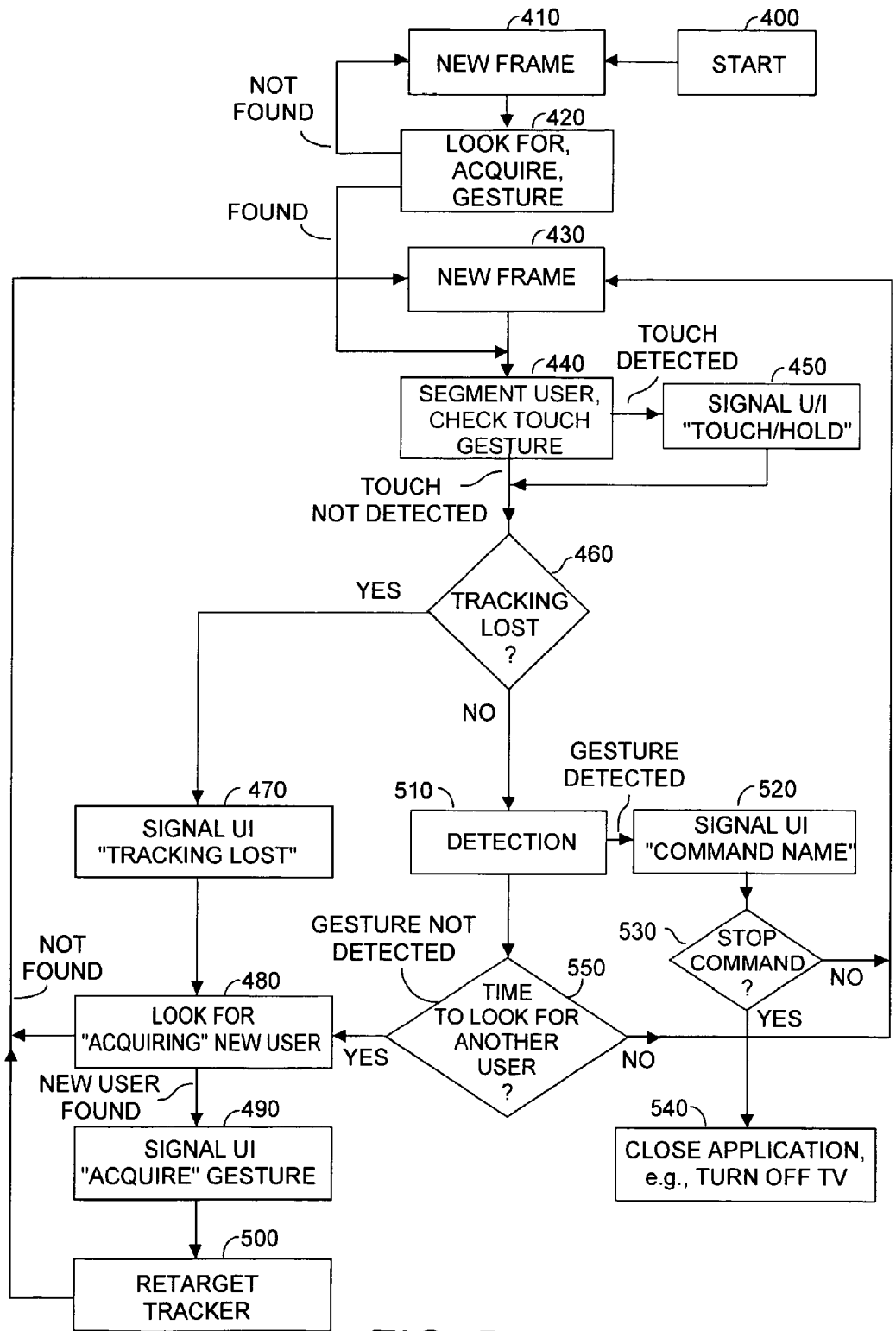
FIG. 5 is a flow charge depicting generic exemplary method steps implementing user-centric gesture control, including further details concerning handing off device control from one user to another user, according to embodiments of the present invention.

FIG. 5 depicts a further exemplary algorithm such as can be stored in memory 160 in system 100 (see FIG. 2) for execution by processor 170 (or other processor) to implement gesture recognition, according to embodiments of the present invention, and more particularly to implement a change in user control of device 20. As was the case with FIG. 4, system 100 initially acquires several frames of data to image user 30, and to then define an interaction zone 200, and hot spots 210, 210, etc. therein for user 20.

Similarly to what was described with respect to FIG. 4, at method step 400, the user makes a "start" or "turn-on" gesture, and at method step 410, camera system 140 acquires a frame of three-dimensional data that includes any user interaction within interaction zone 200. At step 420 system 100 searches for an acquisition gesture. As was described with respect to FIG. 4, the gesture preferably is identified by comparing gestures stored in library 160 with a just-acquired gesture, discerned for example by processor 170 from data output from camera system 140. If an acquisition gesture is not acquired, the routine returns to step 410, to examine a next acquired frame of camera system data. Eventually a acquisition gesture will be acquired at step 420.

At this juncture step 430 is bypassed and at step 440, system 100 examines the hot spots or hot zones 210, 220, 230, which act as segments of the interaction zone 200, to determine whether a touch gesture has been detected. If detected, the user interface (UI) signals a "touch" or "hold" event, and the method branches to step 460 to test whether tracking of the user has been lost. Input to step 460 also includes the absence of touch detection at step 440. If tracking has not been lost, step 460 branches to detection step 510. If a gesture is detected, the method branches to step 520 and a user interface "command name" signal is issued. Step 530 tests to determine whether a stop command has been detected, e.g., a stop gesture. If a stop command has been detected, then at step 540 system 100 will turn-off the application, in this example, television 20. But if test 530 determines that the gesture is not a stop command, then the routine branches back to step 530, to examine the next acquired frame of data from camera system 140.

Detection step 510 also outputs to step 550, which tests for the presence of another user. Perhaps the first user has an errand to run and will pass control of device 20 to a second user. As noted, one can define a gesture intended to alert system 100 to the transfer of remote control command from one user to another user, perhaps a second person sitting next to the initial user. If it is not apparently time to search for another user, then step 510 branches back to step 530, and the next frame of acquired data is examined. However if step 510 determines that no gesture is detected and it is time to look for a new user, the routine branches to step 480. If a new user cannot be determined, the routine branches back to step 430, and data from the next acquired frame is analyzed. However if step 480 determines a new user is present, then the routine branches to step 490 and a signal UI acquisition gesture is tested. Step 500 then retargets tracking.

In summary, it will be appreciated that user-centric gesture recognition provides many advantages over prior art techniques. Advantageously, embodiments using hot zones can reduce incidents of false gesture identification and recognition. The present invention may be practiced with a variety of prior art three-dimensional imaging systems 140, including without limitation Canesta, Inc. time-of-flight (TOF) systems. An advantage of such TOF systems is that overall system and method reliability can be enhanced, as gesture recognition is not likely to be tricked by user clothing colors, reflections, by ambient light, and the like.

Modifications and variations may be made to the disclosed embodiments without departing from the subject and spirit of the invention as defined by the following claims.

What is claimed is:

1. A machine system implemented method providing user-centric gesture recognition, the method comprising:
   receiving three-dimensional (3D) tracking data representative of respective positionings of respective ones of plural user body parts of an automatically tracked first user of the machine system, the plural user body parts being in a field of sensing of one or more sensors of the machine system;
   defining a first movable 3D frame of reference that moves in coordination with movement of a first subset of one or more of the plural user body parts of the tracked first user but not in coordination with movement of one or more other body parts;
   defining a major interaction enabled zone positioned within the first movable 3D frame of reference and moving as the first movable 3D frame of reference moves;
   determining based at least on the received 3D tracking data if at least one of the other body parts of the tracked first user is within the defined major interaction enabled zone;
   based at least on the received 3D tracking data, recognizing a gesture made by the at least one of the other body parts that is determined to be within the defined major interaction enabled zone;
   comparing said recognized gesture to contents of a gesture library of one or more pre-defined gestures that are useable to control by way of gesture, a gesture controllable device of the machine system; and
   based at least on finding a match between a recognized said user-gesture and contents of said gesture library, causing a carrying out of a corresponding gesture initiated action by the gesture controllable device.

2. The method of claim 1, further including:
   defining within the major interaction enabled zone two or more spaced apart, 3D hot zones that move as the major interaction enabled zone moves;
   determining if at least one of the other body parts of the tracked first user is within at least one of the defined hot zones;
   recognizing a gesture made by the at least one of the other body parts that is determined to be within at least one of the defined hot zones;
   wherein said comparing of the recognized gesture to contents of the gesture library includes determining if the respectively recognized gesture includes at least one of positioning and moving of predefined body parts within at least one of the two or more spaced apart, 3D hot zones in accordance with one or more pre-defined gestures of the gesture library that call for the pre-defined gesture to be made respectively within at least one of the two or more spaced apart, 3D hot zones.

3. The method of claim 1, wherein said gesture library stores at least one gesture selected from a group consisting of (i) a gesture signifying desire to acquire control of said gesture controllable device, (ii) a gesture signifying handing off of gesture control of said gesture controllable device from said user to a successor user, (iii) a gesture made with only one hand, (iv) a gesture made with two hands, and (v) a gesture causing a menu to be displayed.

4. The method of claim 1, further including causing said machine system to alert the user that a user-gesture may not have been correctly recognized, and inviting said user to confirm a gesture recognized by the machine system.

5. The method of claim 4, wherein a user can confirm the gesture recognized by the machine system by making a user movement within a sub-region defined within said first movable 3D frame of reference.

6. The method of claim 5, further including causing said machine system to signal said user that improper recognition of a questionable gesture may have occurred, and causing said machine system to provide an option for said user to at least confirm said questionable gesture as being correctly recognized by the machine system.

7. The method of claim 1, wherein said gesture library stores gestures that are independent of previously made gestures.

8. The method of claim 1, wherein said one or more sensors of the machine system include image capture devices that are configured to provide depth image data by use of at least one of a (i) parallex-method imaging system, (ii) a time-of-flight imaging system, (iii) a phase-based time-of-flight imaging system, (iv) a shutter-based time-of-flight imaging system, and (v) a system using at least two spaced-apart cameras.

9. A machine system having user-concentric gesture recognition, the system including stored code configured to cause one or more programmable parts of the machine system to carry out a method comprising:
- receiving three-dimensional (3D) image data representative of respective positionings of respective ones of plural user body parts of an automatically tracked first user of the machine system, the plural user body parts being in a field of view of one or more image capture devices of the machine system;
- identifying the automatically tracked first user when said user is within said field of view;
- defining at least a first movable 3D frame of reference that moves in coordination with movement of a first subset of one or more of the plural user body parts of the identified first user but not in coordination with movement of one or more other body parts;
- defining a major interaction enabled zone positioned within the first movable 3D frame of reference, the defining of the major interaction enabled zone including sizing and positioning the major interaction enabled zone in accordance with parameters of an accessible body profile of the identified first user;
- determining if at least one of the other user body parts of the identified first user not in the first subset of body parts, is within the defined major interaction enabled zone;
- recognizing a gesture made by the at least one of the other body parts that is determined to be within the defined major interaction enabled zone;
- comparing said recognized gesture to contents of a gesture library including a plurality pre-defined gestures defined as occurring within at least one subregion of the major interaction enabled zone, at least one of the pre-defined gestures being defined as useable to control a gesture controllable device of the machine system; and
- based at least on finding a match between a recognized said user-gesture and contents of said gesture library, outputting a signal useable to control said gesture controllable device.

10. The machine system of claim 9, wherein the carried out method further includes defining two or more spaced apart subregions within said major interaction enabled zone wherein presence of a portion of said user must be detected in order for a gesture to be a recognized gesture.

11. The machine system of claim 9 wherein said gesture library includes at least one gesture selected from a group consisting of (i) a gesture signifying desire to acquire control of said gesture controllable device, (ii) a gesture signifying handing off control of said gesture controllable device from said user to a successor user, (iii) a gesture made with only one hand, (iv) a gesture made with two hands, and (v) a gesture causing a menu to be displayed.

12. The machine system of claim 9, wherein the carried out method further includes causing said machine system to alert a user that a user-gesture may not have been correctly recognized by the machine system.

13. The machine system of claim 12 wherein the carried out method further includes inviting said user to confirm improper recognition of a gesture.

14. The machine system of claim 13 wherein the carried out method further includes enabling a user to confirm improper recognition of a gesture by making a user movement within a sub-region defined within said major interaction enabled zone.

15. The machine system of claim 13, wherein the carried out method further includes outputting a signal causing said device to alert said user that improper recognition of a gesture may have occurred, and causing said device to provide an option for said user to at least confirm said improper gesture recognition.

* * * * *